(12) United States Patent
Ito

(10) Patent No.: US 9,613,429 B2
(45) Date of Patent: Apr. 4, 2017

(54) IMAGE READING OUT CONTROL APPARATUS, IMAGE READING OUT CONTROL METHOD THEREOF, AND STORAGE MEDIUM

(71) Applicant: CANON KABUSHIKI KAISHA, Tokyo (JP)

(72) Inventor: Kan Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 13/869,510

(22) Filed: Apr. 24, 2013

(65) Prior Publication Data

US 2013/0301877 A1 Nov. 14, 2013

(30) Foreign Application Priority Data

May 8, 2012 (JP) .................................. 2012-107036

(51) Int. Cl.
G06T 7/20 (2006.01)

(52) U.S. Cl.
CPC ...... *G06T 7/20* (2013.01); *G06T 2207/10016* (2013.01)

(58) Field of Classification Search
CPC ...... H04N 5/3456; H04N 5/345; H04N 9/045; H04N 5/335; H04N 5/2258; H04N 5/2628;
(Continued)

(56) References Cited

U.S. PATENT DOCUMENTS

| 4,847,688 A | 7/1989 | Nishimura et al. |
| 5,146,340 A * | 9/1992 | Dickerson ............. G06T 1/0007 348/311 |

(Continued)

FOREIGN PATENT DOCUMENTS

| CN | 1992858 A | 7/2007 |
| CN | 101897174 A1 | 11/2010 |

(Continued)

OTHER PUBLICATIONS

Crooks et al, A Novel CMOS Monolithic Active Pixel Sensor with Analog Signal Processing and 100% Fill Factor, Oct. 26-Nov. 3, 2007 [retrieved Jul. 28, 2016], 2007 IEEE Nuclear Science Symposium Conference Record, vol. 2, pp. 931-935. Retrieved from the Internet: http://ieeexplore.ieee.org/xpls/abs_all.jsp?arnumber=4437171&tag=1.*

(Continued)

*Primary Examiner* — Matthew Bella
*Assistant Examiner* — Dennis Rosario
(74) *Attorney, Agent, or Firm* — Fitzpatrick, Cella, Harper & Scinto

(57) ABSTRACT

An image reading out apparatus reads out a partial image in a frame of an image within an image sensing unit, and outputs image data corresponding to the frame of the image and the partial image to an image development processing unit. A detection unit detects an object in a frame of a first image read out from the image sensing unit, and detects a moving speed of the object. A control unit (i) determines an area corresponding to the object, and (ii) controls, in accordance with the moving speed of the object detected by the detection unit, an interval of time to read out the partial image in the area in a frame of a second image within the image sensing unit. A reading unit reads out the frame of the (Continued)

first image and the partial image within the image sensing unit.

22 Claims, 3 Drawing Sheets

(58) Field of Classification Search
CPC .. G06K 7/10851; G06K 7/10722; G06T 7/20; G06T 7/004
See application file for complete search history.

(56) References Cited

U.S. PATENT DOCUMENTS

| | | | |
|---|---|---|---|
| 5,930,528 A | 7/1999 | Ito et al. | 396/2 |
| 6,147,704 A | 11/2000 | Ito et al. | 348/222 |
| 6,473,120 B2 * | 10/2002 | Hirasawa | H04N 3/1562 348/208.1 |
| 6,741,977 B1 * | 5/2004 | Nagaya et al. | |
| 7,145,596 B2 * | 12/2006 | Kitaguchi | H04N 1/107 348/211.1 |
| 7,551,203 B2 | 6/2009 | Nakayama et al. | |
| 7,834,922 B2 * | 11/2010 | Kurane | H04N 3/1562 348/294 |
| 8,477,200 B2 | 7/2013 | Fujita et al. | |
| 2007/0189728 A1 | 8/2007 | Yu | |
| 2011/0032419 A1 | 2/2011 | Sakaniwa et al. | |

FOREIGN PATENT DOCUMENTS

| | | |
|---|---|---|
| CN | 101963738 A1 | 2/2011 |
| CN | 101998029 A1 | 3/2011 |
| CN | 102387392 A | 3/2012 |
| JP | 2002-199382 A | 7/2002 |
| JP | 2004-180240 A | 6/2004 |
| JP | 2007-281961 A | 10/2007 |
| JP | 2009-147479 A | 7/2009 |
| JP | 2010-088049 A | 4/2010 |

OTHER PUBLICATIONS

Japanese Office Action dated Dec. 18, 2015, issued in counterpart Japanese Patent Application No. 2012-107036.
Chinese Office Action dated Nov. 13, 2015, issued in counterpart Chinese Patent Application No 201310165224.3, with an English translation.
Chinese Official Action dated Jun. 1, 2016, issued in corresponding Chinese Patent Application No. 201310165224.3, with an English translation.

* cited by examiner

IMAGE READING OUT CONTROL APPARATUS, IMAGE READING OUT CONTROL METHOD THEREOF, AND STORAGE MEDIUM

CLAIM OF PRIORITY

This application claims the benefit of Japanese Patent Application No. 2012-107036, filed on May 8, 2012, which is hereby incorporated by reference herein in its entirety.

BACKGROUND OF THE INVENTION

Field of the Invention

The present invention relates to an image reading out control apparatus, an image reading out control method thereof, and a storage medium.

Description of the Related Art

In the field of monitoring cameras, a technique to detect an object in an image using an image analysis technique is known. Also, a technique that continuously recognizes and tracks a moving object by attaching a label to the moving object among detected objects is known as a moving object tracking technique.

Japanese Patent Laid-Open No. 2009-147479 describes a technique that, when a moving object is detected on a captured image utilizing the above techniques, extracts only the image data of a specific area including the moving object from the full screen image data and sends it outside.

And, as an advancement of high quality imaging, a CMOS image sensor has become widely used as an image sensing element mounted in digital still cameras and digital video cameras. A CMOS image sensor makes free reading out control possible. For example, it is possible to skip the reading out from unnecessary areas by designating the areas for reading out, and to set a reading out interval to one pixel every several pixels, hereafter defined as "skip-reading out", thus, high speed reading out is realized even though the number of reading out pixels is reduced. Using these techniques, high precision image capturing is realized by skip-reading out from the CMOS image sensor, detecting a moving object from images captured in high speed, and reading out by designating the area to be read out to track the detected moving object.

However, when skip-reading out of a full pixel array and reading out of a partial region where a moving object is detected are performed simultaneously, or in a time divided manner, the reading out speed per unit time becomes slow, as the number of detected moving objects increases. Thus, tracking performance declines when a captured image is used for tracking a moving object.

SUMMARY OF THE INVENTION

The present invention provides a technique to track moving objects efficiently.

According to one aspect, the present invention provides an image reading out control apparatus comprising a detection unit configured to detect an object on an image captured by an image capturing unit, and a control unit configured to control an interval to extract images of a region including the object from the image capturing unit, according to the moving speed of the object detected by the detection unit.

According to another aspect, the present invention provides an image reading out control method for reading out an image from an image capturing unit, comprising detecting an object on images captured by the image capturing unit, and controlling an interval to extract images of a region including the object from the image capturing unit, according to the moving speed of the detected object.

Further features of the present invention will become apparent from the following description of exemplary embodiments (with reference to the attached drawings).

DESCRIPTION OF THE EMBODIMENTS

An exemplary embodiment(s) of the present invention will now be described in detail with reference to the drawings. It should be noted that the relative arrangement of the components, the numerical expressions, and numerical values set forth in these embodiments do not limit the scope of the present invention, unless it is specifically stated otherwise.

Figure 1:
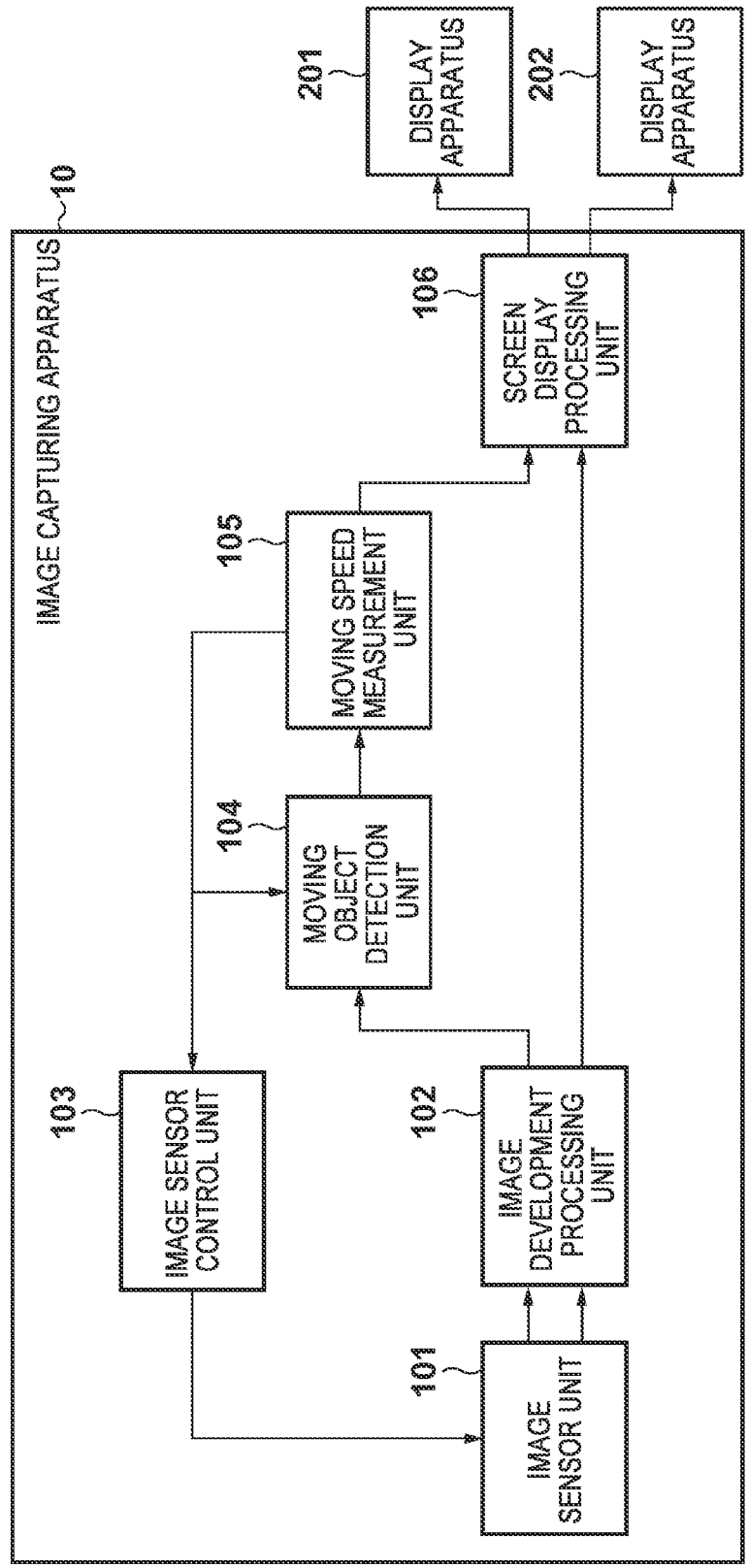
FIG. 1 is a block diagram showing a configuration of an image capturing apparatus according to a first embodiment of the present invention.

FIG. 1 is a block diagram showing a configuration of an image capturing apparatus 10 according to a first embodiment of the present invention. The image capturing apparatus 10 includes an image sensor unit 101, an image development processing unit 102, an image sensor control unit 103, a moving object detection unit 104, a moving speed measurement unit 105, and a screen display processing unit 106. Also, the image capturing apparatus 10 is connected to display apparatuses 201 and 202.

The image sensor unit 101 is constituted by an arrangement, such as a CMOS image sensor, and the like, that converts a photo image on an imaging area of the image sensing element to a digital electric signal by photoelectric conversion, and has a first image sensing mode (full pixel reading out mode) that reads out from the full pixel array, and a second reading out mode (partial reading out mode) that reads out from a part of the full pixel array of the image sensing element.

The image development process unit 102 performs prescribed pixel interpolation and color conversion processes on an electrical signal obtained from the photoelectric conversion by the image sensor unit 101, and generates digital images, such as RGB, YUV, or the like. The image development processing unit 102 also performs prescribed arithmetic processing using digital images after development, and performs image processing, such as white balance, sharpness, contrast, color conversion, and the like, based on the obtained arithmetic processing result.

The image sensor control unit 103 controls the image sensor unit 101 to perform, based on the detection information and measurement information obtained from the moving object detection unit 104 and the moving speed measurement unit 105, skip-reading out from the full pixel array, partial reading out from a designated region, and frequency control of reading out. However, it is not necessary to set simultaneously the region of pixel array to be read out and the frequency of reading out. Preferentially, based on the moving speed of the moving object, it may be configured to control only the frequency of reading out.

The moving object detection unit 104 detects moving objects among captured objects on the digital image that is developed and image processed by the image development processing unit 102. As a moving object detection method, any method such as background differencing, inter-frame differencing, motion vector, and the like, may be utilized. In addition, moving object tracking is also made possible by storing part of the moving object as a template.

The moving speed measurement unit 105 measures the speed of the moving object by calculating the amount of movement between image frames of the moving object detected and tracked by the moving object detection unit 104.

The screen display processing unit 106 generates a window frame and a superimposed screen of various graphic displays for the digital images that are captured by the image sensor unit 101 and are developed and image processed by the image development process unit 102, and performs appropriate processes such as screen arrangement, and the like.

The display apparatuses 201 and 202 display screens generated by the screen display processing unit 106, respectively. One of the two display apparatuses displays images captured by skip-reading out from the full pixel array of the image sensor unit 101. The other display apparatus displays images captured and read out from the partial region controlled by the image sensor control unit 103. The image obtained by skip-reading out from the full pixel array and the image obtained by reading out from the partial region can be displayed on either of the two display apparatuses. However, in the following explanation, for the sake of convenience, the display apparatus 201 displays a screen of captured images read out from the partial region by the control of the image sensor control unit 103. And, the display apparatus 202 displays a screen of captured images read out from the full pixel array by the control of the image sensor control unit 103.

The state before the moving object detection unit 104 is activated or the state when a moving object is not detected among objects by the moving object detection unit 104 is set to normal mode. In the normal mode, the image sensor control unit 103 controls the image sensor unit 101 to read out from the full pixel array. In this normal mode, as a moving object is not detected, if processing time allows, the reading out can be performed from the full pixel array, without skipping to obtain the image data to be developed and image processed by the image development processing unit 102. However, when improvement of some degree in the processing speed is desired, it is better to skip-read from the full pixel array. At this time, digital image data that is captured by the image sensor unit 101, and developed and image processed by the image development processing unit 102 is output to the moving object detection unit 104. If a moving object is not detected among the objects in the captured image, the image is displayed without any change on the display apparatus 202 through the moving object detection unit 104, the moving speed measurement unit 105, and the screen display processing unit 106.

Next, the operation when a moving object is detected among the captured objects by the image sensor unit 101 will be explained. In the normal mode, when images are being captured by reading out from the full pixel array by the image sensor unit 101, it is assumed that a moving object is detected among objects in the image that is input to the moving object detection unit 104 from the image development processing unit 102. When a moving object is detected among the objects, the moving object detection unit 104 attaches ID as an identifier to the moving object and tracks the moving object, and outputs the notification of the detected information including the location information with the ID to the moving speed measurement unit 105 along with the image data that is read out and captured from the full pixel array.

In the case that the image sensor unit 101 is performing reading out from the full pixel array without skipping, the moving object detection unit 104 informs the image sensor control unit 103 of the detected information of the detected moving object, and the image sensor control unit 103 controls the image sensor unit 101 to skip-read out from the full pixel array. The moving speed measurement unit 105 measures, based on the input image data along with location information of the moving object and detected information including ID, the amount of movement of the object between image frames as the speed information for each moving object ID. And, the moving speed measurement unit 105 outputs the measured speed information to the image sensor control unit 103 and the screen display processing unit 106, along with the detected information and image data being input from the moving object detection unit 104.

The image sensor control unit 103 on receiving the detected information and speed information for the respective moving object ID, sets, based on this information, the region of pixels for reading out and the frequency of reading out in the second image capturing mode (partial reading out mode) performed by the image sensor unit 101 for each moving object ID being a target.

Figure 2:
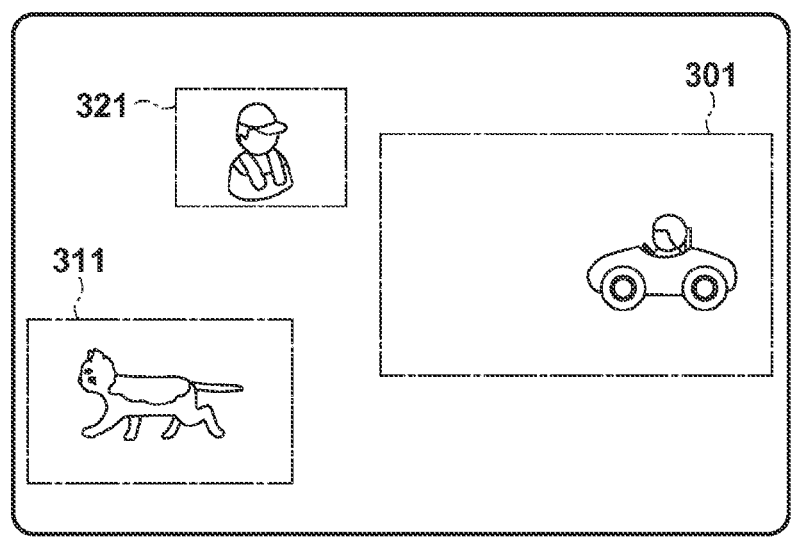
FIG. 2 is a schematic diagram showing the region of reading out from an image sensor according to a first embodiment of the present invention.

FIG. 2 is an example showing the partial region to be read out by the image sensor unit 101. For example, by the image sensor unit 101, a car, an animal, and a person are assumed to be detected as moving objects among the objects read out and captured from the full pixel array. In this case, the reading out region is set as the widest and the reading out frequency is set as the highest for the moving object 301, which is a car that is considered to have the highest moving speed. The reading out region is set to be narrower and the reading out frequency is set to be lower in sequence for the moving object 311, which is an animal, and the moving object 321, which is a person.

Here, the transmission capacity, that is calculated by subtracting the reading out image capacity of the skip-reading out of the full pixel array from the transmission capacity of the image data from reading out the full pixel array, without skipping, that is output from the image sensor unit 101 to the image development processing unit 102, is assigned for the transmission capacity for the image data used for the partial reading out for the respective moving objects. Within the range of upper limit of the transfer capacity, the reading out pixel region and the reading out frequency from the image sensor unit 101 for the respective moving objects are set in proportion to the moving speed of the respective moving objects.

For example, assuming the four fastest moving objects are detected, the reading frequency for targeting the object with the highest speed is set to be 60 fps, then 30 fps for the object with the second highest speed, and 15 fps, and 5 fps in sequence of the moving speed. And, as for the reading out region, assuming the number of pixels of the full pixel array exceeds 4K, full HD may be assigned to the object with the highest moving speed, and then 720p, QHD, QQHD in turn. The transmission capacitance of the image data from the full pixel array, (for example 4K size and 60 fps), may be allocated to the respective objects detected, in proportion to the number of moving objects and the speed of the moving objects.

At this time, if there is a particularly important moving object, it is possible to set a reading out region and a reading out frequency (reading out method) for this object, preferentially. Then, the image sensor control unit 103 controls the image sensor unit 101 according to the reading method to be set as above.

The image sensor unit 101 outputs, according to the reading out method to be set respectively, the skip-reading out image data from the full pixel array, and the image data reading out of the partial region for each moving object, to the image development processing unit 102. The method for outputting the image data to the image development processing unit 102 may be simultaneous parallel processing or time division processing, if the processing power of a processor allows. The respective image data being input to the image development processing unit 102 is output to the screen display processing unit 106 as a screen image, after being development processed and image processed in a similar manner. The screen display processing unit 106 displays, among the images being input, images read out from the partial region for each moving object on the display apparatus 201 in an individual window for each moving object, and displays the image of the skip-reading out from the full pixel array on the display apparatus 202 with the detection frames for the respective moving object being superimposed.

Figure 3:
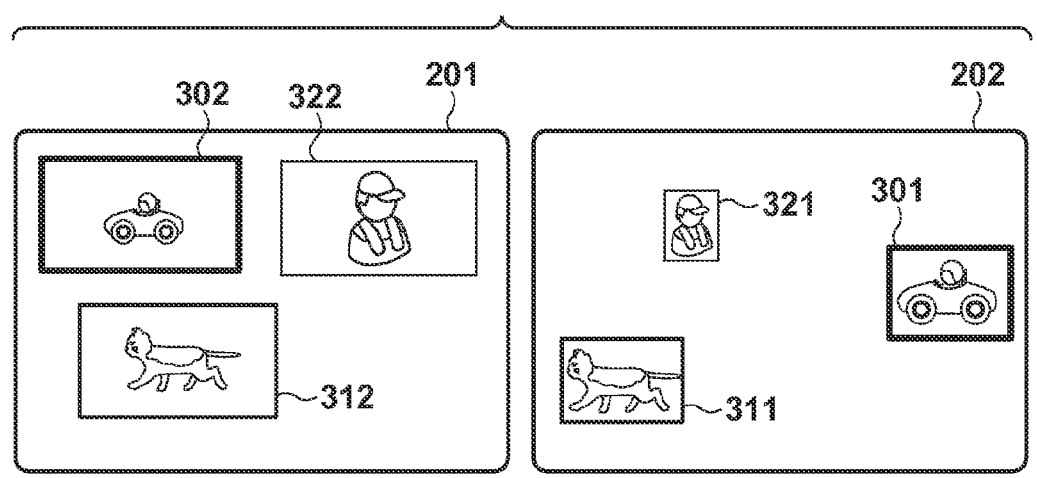
FIG. 3 is a schematic diagram showing an example of a screen display of an image capturing apparatus according to a first embodiment of the present invention.

FIG. 3 is an example of screen images displayed on the display apparatuses 201 and 202. On the display apparatus 201, a partial region for each moving object is displayed in the individual window for each moving object. In particular, a window 322 for the moving object 321, which is a person, a window 312 for the moving object 311, which is an animal, and a window 302 for the moving object 301, which is a car, are displayed respectively. And, on the display apparatus 202, the image of skip-reading out from the full pixel array is displayed, and frames designating the detection region for each moving object are superimposed. In this case, the window display and the line width of the detection frame may be changed according to the speed of the moving objects, that is, in the sequence of a car, an animal, and a person. For example, a wider line width can be set for the faster moving object.

The operations of the image sensor unit 101, that is reading out from the full pixel array, skip-reading out from the full pixel array, and partial reading out, are made possible by utilizing the characteristics of the CMOS image sensor used as an image sensing element. The CMOS image sensor has an electrical circuit attached to each of the pixels, and it is not necessary to read out unnecessary portions of the pixel array. In addition, each pixel equivalently has an individual capacitor, and a non-destructive reading that does not affect the brightness and other characteristics is possible. Thus, equivalent characteristics of reading out is made possible regardless of the reading out method.

As described above, according to this embodiment, reading out from the full pixel array from the image sensing element is performed, and when multiple moving objects are detected among captured objects, an image capturing operation is performed, varying the frequency of reading out of the detection region of a moving object and the region of partial reading from the image sensing element corresponding to the detection region of the moving object, in accordance with the speed of moving object. Thus, an effective tracking of a moving object by reading out and capturing of a partial region of the image sensing element is made possible.

Figure 4:
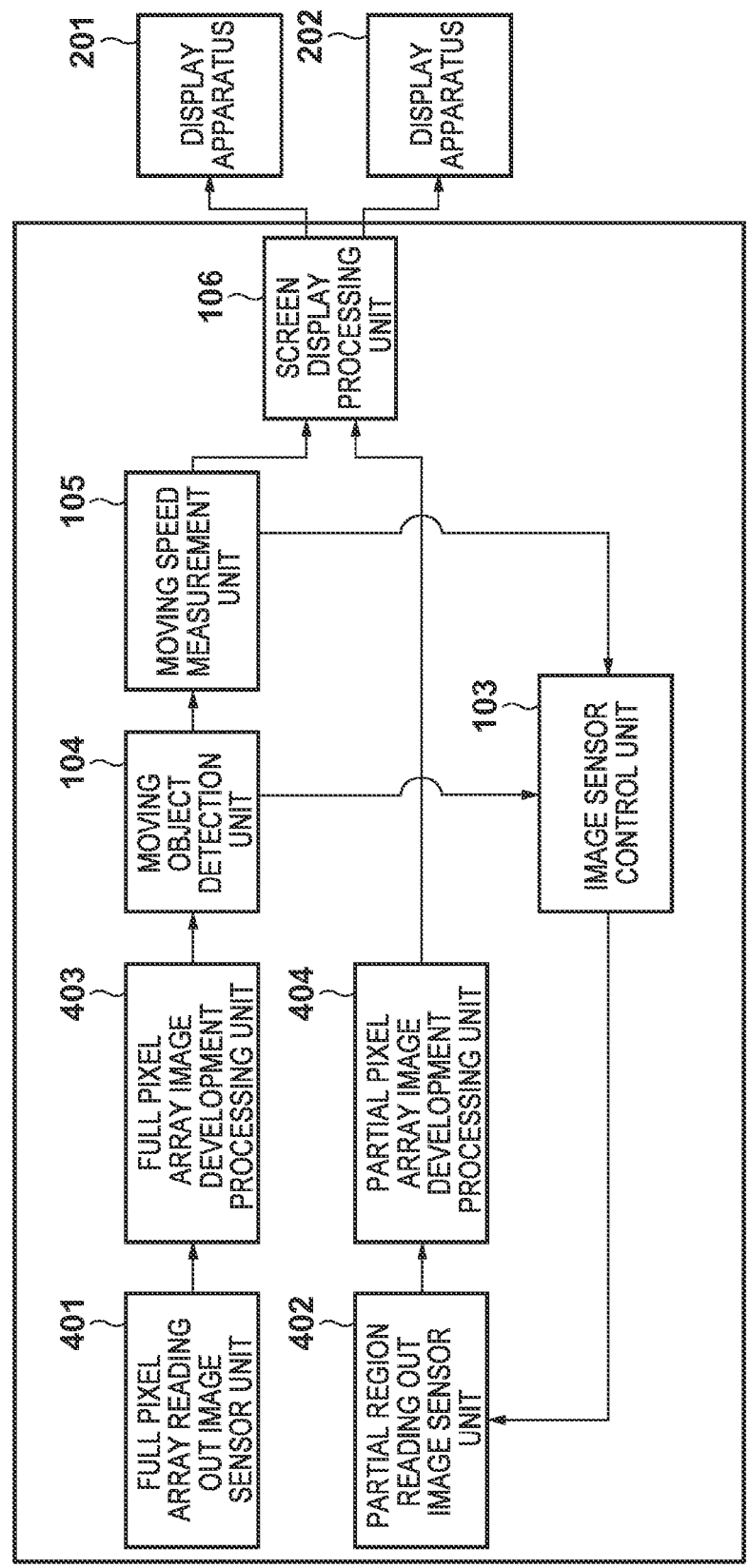
FIG. 4 is a schematic diagram showing a configuration of an image capturing apparatus according to a second embodiment of the present invention.

FIG. 4 is a schematic diagram showing a configuration of an image capturing apparatus 40 according to a second embodiment. The image capturing apparatus 40 includes a full pixel array reading out image sensor unit 401, a partial region reading out image sensor unit 402, a full pixel array image development processing unit 403, a partial pixel array image development processing unit 404, an image sensor control unit 103, a moving object detection unit 104, a moving speed measurement unit 105, and a screen display processing unit 106. The image capturing apparatus 40 is connected to display apparatuses 201 and 202.

The full pixel array reading out image sensor unit 401 is an image sensor unit for capturing images for the full pixel array, and specializes in reading out from the full pixel array. The partial region reading out image sensor unit 402 is a sensor unit specializing in capturing, when a moving object is detected among the images of the full pixel array that are captured by the full pixel array reading out image sensor unit 401, images of each moving object in accordance with the region of reading out and at the frequency set by the image sensor control unit 103.

The full pixel array image development processing unit 403 performs development processing and image processing on the image data captured by the full pixel array reading out image sensor unit 401. The partial pixel array image development processing unit 404 performs development processing and image processing on the image data captured by the partial region reading out image sensor unit 402. Configurations of the units from the image sensor control unit 103 to the screen display processing unit 106, and the display apparatuses 201 and 202 are the same as those of the first embodiment. Thus, an explanation is omitted.

As described above, the image sensor unit 101 explained in the first embodiment may be divided and configured with the full pixel array reading out image sensor unit 401, and the partial region reading out image sensor unit 402. The image development processing unit 102 may be divided and configured with the full pixel array image development processing unit 403, and the partial pixel array image development processing unit 404.

(Other Embodiments)

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiments of the present invention, and by a method performed by the computer of the system or an apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image reading out apparatus for reading out a frame of an image and a plurality of partial images in a frame of an image within an image sensing unit, and for outputting first image data corresponding to the frame of the image and second image data corresponding to the plurality of partial images to an image output unit, the apparatus comprising:
   (A) a memory; and
   (B) at least one processor operatively coupled to the memory, serving as:
      (a) a reading unit configured to read out, in a first mode, the frame of the image within the image sensing unit and to read out, in a second mode, the plurality of partial images within the image sensing unit;
      (b) a detection unit configured to detect a plurality of objects in a frame of a first image read out from the image sensing unit by the first mode for reading out the first image, not limited to a plurality of areas corresponding to the plurality of objects, and to detect moving speeds of each of the plurality of objects in the frame of the first image; and
      (c) a control unit configured (i) to determine a plurality of areas included in a frame of a second image in accordance with the plurality of objects detected in the frame of the first image read out in the first mode, and (ii) to set, in accordance with the detected moving speeds of each of the plurality of objects detected by the detection unit, different frequencies for selectively reading out, in the second mode, each of the plurality of partial images of the plurality of areas in the frame of the second image within the image sensing unit.

2. The image reading out apparatus according to claim 1, wherein the control unit determines the plurality of areas in accordance with the moving speeds of the plurality of objects detected by the detection unit.

3. The image reading out apparatus according to claim 1, wherein the control unit determines, when the plurality of objects are detected by the detection unit, the different frequencies for reading out each of a plurality of partial images corresponding to each of the plurality of objects detected by the detection unit, from the image sensing unit.

4. The image reading out apparatus according to claim 1, wherein the control unit determines, when the plurality of objects are detected by the detection unit, respective positions of the plurality of areas, so as to read out the plurality of partial images corresponding to the plurality of objects detected by the detection unit, in accordance with the respective moving speeds of the plurality of objects.

5. The image reading out apparatus according to claim 1, wherein the detection unit is configured to detect the plurality of objects in the frame of the first image when the first image is read out from the image sensing unit in the first mode for reading out a whole range of pixels within the image sensing unit, and the control unit is configured to determine positions of the plurality of areas included in the frame of the second image of a whole range of the pixels within the image sensing unit.

6. The image reading out apparatus according to claim 1, wherein the detection unit is configured to detect the plurality of objects in the frame of the first image when the first image is read out from the image sensing unit in the first mode for reading out a predetermined range of pixels within the image sensing unit, and the control unit is configured to determine positions of the plurality of areas included in the frame of the second image of a predetermined range of the pixels within the image sensing unit.

7. The image reading out apparatus according to claim 1, wherein the reading unit reads out image data from the image sensing unit in a second mode in which the plurality of partial images of a plurality of limited regions are read out from the image sensing unit and in the first mode in which the image not limited to a limited region is read out from the image sensing unit, and the control unit sets, in accordance with the moving speeds of the plurality of objects detected by the detection unit, the different frequencies for reading out in the second mode each of the plurality of partials images of the plurality of regions corresponding to the plurality of objects from the image sensing unit.

8. The image reading out apparatus according to claim 1, wherein the control unit sets, in accordance with the moving speeds of the plurality of objects detected by the detection unit, the different frequencies for reading out each of the plurality of partial images of the plurality of areas of the frame of the second image within the image sensing unit, such that the greater the moving speed is, the higher the frequency of reading out the partial image is.

9. An image reading out method of reading out a frame of an image and a plurality of partial images in a frame of an image within an image sensing unit, and outputting first image data corresponding to the frame of the image and second image data corresponding to the plurality of partial images to an image output unit, the method comprising:
   reading out, in a first mode, the frame of the image within the image sensing unit;
   detecting a plurality of objects in a frame of a first image read out from the image sensing unit in the first mode;
   detecting moving speeds of each of the plurality of objects in the frame of the first image;
   determining a plurality of areas included in a frame of a second image in accordance with the plurality of objects detected in the frame of the first image read out in the first mode for reading out the first image, not limited to a plurality of areas corresponding to the plurality of objects;
   setting, in accordance with the detected moving speeds of each of the plurality of objects, different frequencies for selectively reading out in a second mode, each of the plurality of partial images of the areas in the frame of the second image within the image sensing unit; and
   reading out, in the second mode, the plurality of partial images within the image sensing unit.

10. The image reading out method according to claim 9, wherein the plurality of areas are determined in accordance with the moving speeds of the plurality of detected objects.

11. The image reading out method according to claim 9, wherein, when the plurality of objects are detected, the different frequencies for reading out each of a plurality of partial images, corresponding to each of the detected plurality of objects, from the image sensing unit, are determined.

12. The image reading out method according to claim 9, wherein, when the plurality of objects are detected, respective positions of the plurality of objects are determined, so as to read out the plurality of partial images corresponding to the detected plurality of objects, in accordance with the respective moving speeds of the plurality of objects.

13. The image reading out method according to claim 9, further comprising detecting the plurality of objects in the frame of the first image when the first image is read out from the image sensing unit in the first mode for reading out a predetermined range of pixels within the image sensing unit, and determining positions of the plurality of areas included in the frame of the second image of a predetermined range of the pixels within the image sensing unit.

14. The image reading out method according to claim 9, wherein image data is read out from the image sensing unit in the second mode in which the plurality of partial images of a plurality of limited regions are read out from the image sensing unit and in the first mode in which the image not limited to a limited region is read out from the image sensing unit, and the different frequencies for reading out in the second mode of each of the plurality of partial images of the plurality of limited regions corresponding to the plurality of objects from the image sensing unit is set in accordance with the moving speeds of the plurality of detected objects.

15. The image reading out method according to claim 9, wherein, in accordance with the moving speeds of the plurality of objects, the different frequencies for reading out each of the plurality of partial images of the plurality of areas in the frame of the second image within the image sensing unit is changed, such that the greater the moving speed is, the higher the frequency of reading out the partial image is.

16. A non-transitory computer-readable storage medium storing a computer program for reading out a frame of an image and a plurality of partial images in a frame of an image within an image sensing unit, and for outputting first image data corresponding to the frame of the image and second image data corresponding to the plurality of partial images to an image output unit, the computer program comprising:
    reading out, in a first mode, the frame of the image within the image sensing unit;
    detecting a plurality of objects in a frame of a first image read out from the image sensing unit in the first mode for reading out the first image, not limited to a plurality of areas corresponding to the plurality of objects;
    detecting moving speeds of each of the plurality of objects in the frame of the first image;
    determining a plurality of areas included in a frame of a second image in accordance with the plurality of objects detected in the frame of the first image read out in the first mode;
    setting, in accordance with the detected moving speeds of each of the plurality of objects, different frequencies for selectively reading out, in a second mode, each of the plurality of partial images of the plurality of areas in the frame of the second image within the image sensing unit; and
    reading out in the second mode the plurality of partial images within the image sensing unit.

17. The non-transitory computer-readable storage medium according to claim 16, wherein the plurality of areas are determined in accordance with the moving speeds of the plurality of detected objects.

18. The non-transitory computer-readable storage medium according to claim 16, wherein, when the plurality of objects is detected, the different frequencies for reading out each of a plurality of partial images corresponding to each of the detected plurality of objects, from the image sensing unit, are determined.

19. The non-transitory computer-readable storage medium according to claim 16, wherein, when the plurality of objects are detected, respective positions of the plurality of areas are determined, so as to read out the plurality of partial images corresponding to the detected plurality of objects, in accordance with the respective moving speeds of the plurality of objects.

20. The non-transitory computer readable storage medium according to claim 16, the computer program further comprising detecting the plurality of objects in the frame of the first image when the first image is read out from the image sensing unit in the first mode for reading out a predetermined range of pixels within the image sensing unit, and determining positions of the plurality of areas included in the frame of the second image of a predetermined range of the pixels within the image sensing unit.

21. The non-transitory computer-readable storage medium according to claim 16, wherein image data is read out from the image sensing unit in the second mode in which the plurality of partial images of a plurality of limited regions are read out from the image sensing unit and in the first mode in which the image not limited to a limited region is read out from the image sensing unit, and the different frequencies for reading out in the second mode each of the plurality of partial images of the plurality of limited regions corresponding to the plurality of objects from the image sensing unit is set in accordance with the moving speeds of the plurality of detected objects.

22. The non-transitory computer readable storage medium according to claim 16, wherein, in accordance with the moving speeds of the plurality of objects, the different frequencies for reading out each of the plurality of partial images of the plurality of areas in the frame of the second image within the image sensing unit is changed, such that the greater the moving speed is, the higher the frequency of reading out the partial image is.

* * * * *